Nov. 21, 1967  O. BAY  3,353,834

CHUCKS

Filed June 2, 1964

Inventor
Otto Bay by Michael S. Striker
Atty

United States Patent Office 3,353,834
Patented Nov. 21, 1967

3,353,834
CHUCKS
Otto Bay, Luzernstrasse 24, Subingen, Switzerland
Filed June 2, 1964, Ser. No. 371,964
9 Claims. (Cl. 279—82)

The invention relates to a chuck for replaceable tools and more particularly to chucks having a chuck body with an internal tapered portion shaped to receive the correspondingly tapered shank of a tool or tool holder having an annular clutch keyway. The present standards of precision generally require workpieces be machine finished without rechucking or reclamping necessitating the frequent change of tools.

The main object of the invention is to provide a rapid change chuck by means of which a substantial saving in time is achieved compared with conventional chucking devices.

According to the present invention a chuck comprises a chuck body threadedly mounted on a clamping nut carrying an external guide ring displaceably mounted thereon, segmentally shaped dogs displaceably guided in radially directed guide channels for releasable engagement in an annular groove of the shank of a tool, and resilient devices on the clamping nut bearing against and holding the dogs in contact with the inner side of the guide ring to displace the dogs with respect to the clamping nut, said displacement being co-ordinated with the location of the contact areas of the individual dogs so that all of the dogs are simultaneously positioned in their engaged or disengaged positions.

In order that the invention may be more fully understood an embodiment in accordance therewith will now be described by way of example with reference to the accompanying drawings, in which.

Figure 1:
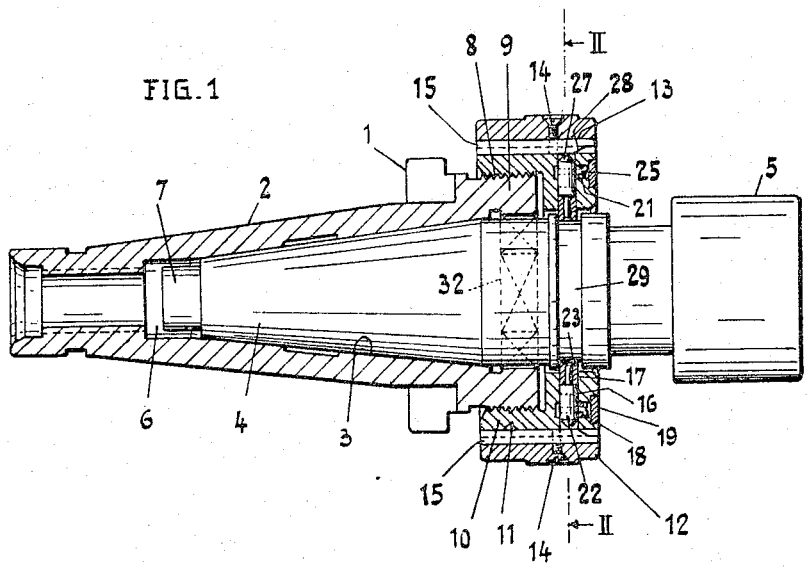
FIG. 1 is an axial cross-section of a chuck with a tool inserted.
Figure 2:
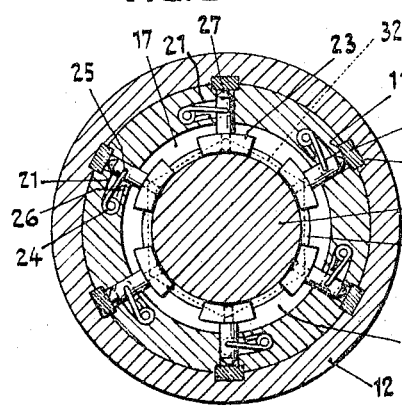
FIG. 2 is a cross-section along the line II—II of FIG. 1.
Figure 3:
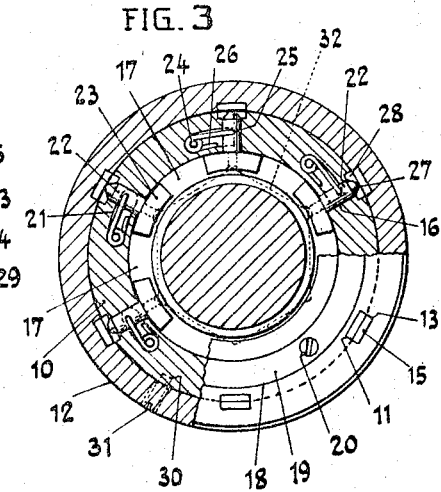
FIG. 3 is a cross-section similar to FIG. 2 but showing the chuck ready to receive the shank of the tool and FIG. 4 is a fragmentary sectioned detail view of the novel chuck.
Figure 4:
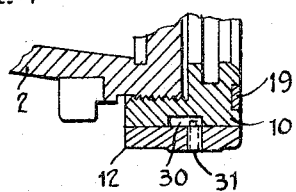

Referring to the drawings the chuck has a chuck body 1, including a conical rear part 2, which may be clamped in the tool spindle of a prime mover or machine tool in the conventional manner for milling and boring tools. The chuck body 1 has a hollow interior formed with a taper 3 co-axial with the outer cone, which is intended to receive the correspondingly tapered shank 4 of a tool 5 or of a tool carrier, e.g. a taper sleeve or a draw-in collet chuck. At the inner extremity of the hollow taper 3, the chuck body 1 has a clutch keyway or slot 6 for receiving the driving head 7 such as used on conventional milling and boring tools for imparting a rotary drive to the tool.

The front part 9 of the chuck body 1 is provided with an external thread 8 on which is screwed an internally threaded clamping nut 10 in the form of an annular member in the outer periphery of which six axial grooves 11 are equiangularly spaced and act as a guide for a guide ring 12 axially displaceable on the clamping nut 10 and having an outer knurled periphery and further having at its interior axial grooves 13, corresponding to grooves 11, in each of which a key 15 is secured by a screw 14 engaging in the corresponding axial groove 11 of the clamping nut. In each axial groove 11, the clamping nut 10 is traversed by a radial bore 16 the inner extremity of which opens into an annular groove 17. The clamping nut moreover has on its forward end an annular groove 18 to receive a covering ring 19 secured therein by screws 20 and externally closing off six elongated holes 21, opening into the bottom of the annular groove 18 and each intersecting one of the radial bores 16. In each radial bore 16 there is a sliding bolt 22 axially displaceable therein, to the narrowed inner extremity of which an annular segment 23 is riveted, the bolts being housed in the respective annular grooves 17 together with the respective annular segments 23, bolts 22 and segments 23 constituting locking means movably carried by said annular member 10. The elongated holes 21 are each crossed by one sliding bolt 22 and contain biasing means such as torsion springs 24 disposed axially parallel to the axis of the clamping nut, with one bent over limb 25 thereof traversing the sliding bolt 22, whereas the other limb 26 bears against a longitudinal side of the elongated hole 21.

This spring 24 presses the sliding bolt 22 with its tapering end 27 against the key 15 which has an oblique taper face 28 facing towards the sliding bolt and which during the axial displacement of the actuating means, which include guide ring 12, on the clamping nut 10 from the rear or rest position towards the front or actuating position, displaces the sliding bolt radially inwards against the action of the spring 24. As a result, the segments 23 evenly and conjointly partly pass from the annular groove 17 into a peripheral groove 29 at the base of the shank 4 of the tool 5 inserted in the chuck beforehand. If the clamping nut 10 is then screwed on the thread 8 to tighten the chuck, the tool 5 is pressed with its tapered shank 4 through the segment pieces 23, acting as driving dogs, into the hollow taper 3 of the chuck body 1. Conversely, when unscrewing the clamping nut 10 on the thread 8, i.e., in a direction to loosen the chuck, the taper shank 4 is freed from the hollow taper 3 of the chuck body 1, and owing to the axial displacement of the guide ring the annular segments 23 are retracted from the peripheral groove portion 29 of the tool by the action of the corresponding springs 24, so that the tool may be withdrawn forwardly out of the chuck. The guide ring 12 has a stop or abutment pin 31 engaging in an axial groove 30 in the clamping nut to limit axial displacement of the latter.

In addition to the driving slot 6 at the extreme end of the hollow taper 3, the chuck body 1 has a hollow hexagon 32 for transmission of spindle rotation to such tools as are equipped with a hexagon head instead of the driving-flat head 7.

For the purpose of displacing the segments radially into and out of the peripheral groove of the tool, the guide ring 12 could be rotatably mounted on the clamping nut, and may on its inner side have guide surfaces appropriately situated on the inner periphery, which during the rotation of the guide ring with respect to the clamping nut, engage and disengage the segments.

What I claim is:

1. In a chuck, particularly for mounting a power driven rotary tool, in combination, an annular member adapted to be connected to a prime mover for rotation about its own axis, said annular member having an interior portion adapted to receive a portion of a tool and provided with a plurality of angularly spaced passages; a plurality of angularly spaced locking means respectively snugly received in said passages and thereby carried by said annular member for radial movement with respect thereto, each of said movable locking means having a portion adapted to engage said tool portion for locking engagement therewith against axial and radial movement of the tool; biasing means mounted on said annular member adjacent to one side of each passage for biasing said locking means radially outwardly away from said tool portion; and actuating means carried by said annular member for movement between a rest position and an actuating position and operatively engaging said locking means for moving the latter into locking engagement with said tool portion against the bias of said biasing means when said actuating means is moved to said actuating position.

2. The combination according to claim 1, wherein said actuating means comprises an outer annular member mounted on and surrounding said first mentioned annular member and relatively movable with respect thereto, said outer annular member including at the interior thereof cam means cooperating with said locking means for moving the latter radially inwardly in response to movement of said actuating means to said actuating position thereof.

3. The combination according to claim 1, further comprising guide means for guiding said actuating means for axial movement only with respect to said annular member.

4. The combination according to claim 1, wherein said passages are radial bores, each of said locking means including a cylindrical portion slidably received in the respective one of said bores and said biasing means including a plurality of springs each operating between said annular member and a respective one of said locking means to bias the latter away from said tool portion.

5. The combination according to claim 4, wherein the tool portion received in said annular member has a peripheral annular keyway, each of said locking means including an innermost portion dimensioned to enter into the interior of the keyway into engagement with the bottom thereof, said innermost portion of each of said locking means having an arcuate end portion corresponding to the outline of the portion of the bottom of the keyway to be engaged thereby to securely lock the tool axially and radially.

6. The combination according to claim 1, wherein said locking means are equiangularly spaced and said actuating means is arranged to simultaneously move all of said locking means an equal distance toward said tool portion so as to securely lock the latter therebetween.

7. The combination according to claim 1, where said annular member is provided with an internally threaded portion adapted to be screwed onto an externally threaded hollow portion of a prime mover, the shank of a tool received in said annular member extending in driving engagement into the hollow portion of the prime mover and freely removable therefrom in axial direction in response to movement of said actuating means to said rest position thereof releasing said locking means to the action of said biasing means.

8. The combination according to claim 1, wherein said biasing means comprises torsion spring means operatively connected with the respective locking means.

9. In a chuck, particularly for mounting a power-driven rotary tool, in combination, an annular member adapted to be connected to a prime mover for rotation about its own axis, said annular member having an interior portion adapted to receive a portion of a tool; a plurality of angularly spaced locking means movably carried by said annular member for radial movement with respect thereto, each of said movable locking means having a portion adapted to engage the tool portion for locking engagement therewith against axial and radial movement of the tool; biasing means carried by said annular member for permanently biasing said locking means radially outwardly away from the tool portion; actuating means carried by said annular member for movement between a rest position and an actuating position and operatively engaging said locking means for moving the latter into locking engagement with the tool portion against the bias of said biasing means when said actuating means is moved to said actuating position, said actuating means comprising an outer annular member mounted on and surrounding said first mentioned annular member and relatively movable with respect thereto, said outer annular member including at the interior thereof cam means cooperating with said locking means for moving the latter radially inwardly in response to movement of said actuating means to said actuating position thereof; and guide means for guiding said actuating means for axial movement with respect to said annular member, said guide means including a plurality of angularly spaced axial channels provided on one of said members and corresponding protrusions on the other of said members adapted to engage with and be guided in said channels, said protrusions constituting said cam means.

References Cited

UNITED STATES PATENTS

| 1,856,793 | 5/1932 | Smith | 279—74 |
| 3,116,068 | 12/1963 | Pfister | 279—72 |

FOREIGN PATENTS

| 407,414 | 12/1944 | Italy. |

ROBERT C. RIORDON, *Primary Examiner.*

H. V. STALHUTH, *Assistant Examiner.*